(12) United States Patent
Romine

(10) Patent No.: US 7,905,812 B2
(45) Date of Patent: Mar. 15, 2011

(54) PTO BRAKE

(75) Inventor: Michael A. Romine, Oneonta, AL (US)

(73) Assignee: Eaton Corporation, Cleveland, OH (US)

( * ) Notice: Subject to any disclaimer, the term of this patent is extended or adjusted under 35 U.S.C. 154(b) by 383 days.

(21) Appl. No.: 11/701,582

(22) Filed: Feb. 2, 2007

(65) Prior Publication Data

US 2008/0188349 A1 Aug. 7, 2008

(51) Int. Cl.
*B60W 10/00* (2006.01)
(52) U.S. Cl. .................. 477/92; 74/15.66; 74/15.88
(58) Field of Classification Search .................. None
See application file for complete search history.

(56) References Cited

U.S. PATENT DOCUMENTS

| | | | |
|---|---|---|---|
| 3,400,601 A * | 9/1968 | Ruhl et al. ................. 74/339 |
| 4,361,060 A | 11/1982 | Smyth | |
| 4,455,883 A | 6/1984 | Radcliffe | |
| 4,527,446 A | 7/1985 | Borodin | |
| 4,550,627 A | 11/1985 | Lauer et al. | |
| 4,593,580 A | 6/1986 | Schulze | |
| 4,595,986 A | 6/1986 | Daubenspeck et al. | |
| 4,754,665 A | 7/1988 | Vandervoort | |
| 4,850,236 A | 7/1989 | Braun | |
| 4,899,607 A | 2/1990 | Stainton | |
| 4,920,815 A | 5/1990 | Reynolds | |
| 4,974,468 A | 12/1990 | Reynolds et al. | |
| 5,000,060 A | 3/1991 | Reynolds et al. | |
| 5,222,404 A | 6/1993 | Stine | |
| 5,272,929 A | 12/1993 | Fletcher et al. | |
| 5,272,931 A | 12/1993 | Daniel | |
| 5,281,902 A | 1/1994 | Edelen et al. | |
| 5,370,013 A | 12/1994 | Reynolds et al. | |
| 5,390,561 A | 2/1995 | Stine | |
| 5,435,212 A | 7/1995 | Menig | |
| 5,528,950 A | 6/1996 | Organek et al. | |
| 5,546,823 A | 8/1996 | Stine et al. | |
| 5,549,185 A * | 8/1996 | Kale ................. 192/12 C |
| 5,582,069 A | 12/1996 | Genise | |
| 5,582,558 A | 12/1996 | Palmeri et al. | |
| 5,609,062 A | 3/1997 | Reynolds | |
| 5,611,242 A | 3/1997 | Santachiara | |
| 5,620,392 A | 4/1997 | Genise | |
| 5,642,643 A | 7/1997 | Reynolds et al. | |
| 5,651,292 A | 7/1997 | Genise | |
| 5,661,998 A | 9/1997 | Genise | |
| 5,679,096 A | 10/1997 | Stine et al. | |
| 5,682,790 A | 11/1997 | Genise | |
| 5,713,443 A | 2/1998 | Kronstadt | |
| 5,713,445 A | 2/1998 | Davis et al. | |
| 5,735,771 A | 4/1998 | Genise | |
| 5,974,354 A | 10/1999 | Janecke et al. | |
| 5,974,906 A | 11/1999 | Stine et al. | |
| 6,015,366 A | 1/2000 | Markyvech et al. | |
| 6,080,081 A * | 6/2000 | Sauermann et al. ............ 477/79 |
| 6,123,643 A | 9/2000 | Davis et al. | |

(Continued)

*Primary Examiner* — David D Le
*Assistant Examiner* — Justin Holmes
(74) *Attorney, Agent, or Firm* — Rader, Fishman & Grauer PLLC

(57) ABSTRACT

An embodiment includes a method of engaging a PTO with a drivetrain includes detecting a value representative of the speed of a PTO output gear, and detecting a value representative of the speed of a PTO input gear. The method further includes reducing the speed of one of the PTO output gear and the PTO input gear, and engaging the PTO input gear with the PTO output gear without the use of a clutch to synchronize the speed of the PTO input gear with the PTO output gear.

19 Claims, 3 Drawing Sheets

U.S. PATENT DOCUMENTS

| | | |
|---|---|---|
| 6,463,823 B2 | 10/2002 | Walker |
| 6,564,663 B2 * | 5/2003 | Rioux et al. ................ 74/336 R |
| 6,658,339 B1 | 12/2003 | Wright et al. |
| 7,104,920 B2 | 9/2006 | Beaty et al. |
| 7,234,367 B2 * | 6/2007 | Hou et al. ......................... 74/11 |
| 7,318,788 B2 * | 1/2008 | Karlsson et al. ................ 477/78 |
| 7,347,804 B2 * | 3/2008 | Steen et al. ..................... 477/77 |
| 2002/0032100 A1 * | 3/2002 | Walker .......................... 477/175 |
| 2007/0209902 A1 * | 9/2007 | Muetzel et al. ............... 192/216 |
| 2008/0092676 A1 * | 4/2008 | Steinborn et al. ............. 74/15.2 |

* cited by examiner

PTO BRAKE

TECHNICAL FIELD

The disclosure generally relates to vehicles with a power take off (PTO) drive, and specifically to engaging and disengaging PTO drives for a vehicle.

BACKGROUND

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference in their entirety. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems may be seen by reference to U.S. Pat. Nos. 4,455,883; 4,550,627; 4,899,607; 4,920,815; 4,974,468; 5,000,060; 5,272,931; 5,281,902; 5,222,404; and 6,463,823, the disclosures of which are incorporated herein by reference in their entirety.

Three-position splitter actuators and transmission systems utilizing same are disclosed in U.S. Pat. Nos. 5,651,292 and 5,661,998, the disclosures of which are incorporated herein by reference in their entirety.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292; 5,679,096; 5,682,790 and 5,735,771; the disclosures of which are incorporated herein by reference in their entirety.

U.S. Pat. No. 4,527,446, the disclosure of which is incorporated herein by reference in its entirety, discloses a fully automated, blocked-type transmission wherein the main section is automatically shifted to main section neutral during each shift.

PTO systems for vehicle drivetrains may be seen by reference to U.S. Pat. Nos. 5,070,982 and 6,497,313, and typically include a PTO synchronizing clutch, or hot-shift clutch, to synchronize and engage PTO input and output components, such as shafts, gears, or clutch members. Some systems include a PTO that may be damaged if operated during maximum engine rotational speed. In these applications, the PTO clutch may be used for disengaging the PTO driven device until the engine speed is reduced.

Inertia brakes, also called clutch brakes, upshift brakes, or start brakes, are known in the prior art, as may be seen by reference to U.S. Pat. Nos. 5,528,950, 5,713,443, 5,713,445, and 6,123,643, the disclosures of which are incorporated herein by reference in their entirety. Inertia brakes may be used to retard spinning of the transmission input shaft caused by inertia and/or random clutch engagement when the master clutch is fully disengaged to allow engaging of a gear ratio in a stopped or substantially stopped vehicle to reduce gear grind during gear engagement. In systems that include manual clutch actuation, actuation of the inertia brake is often initiated by overtravel of the clutch pedal.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
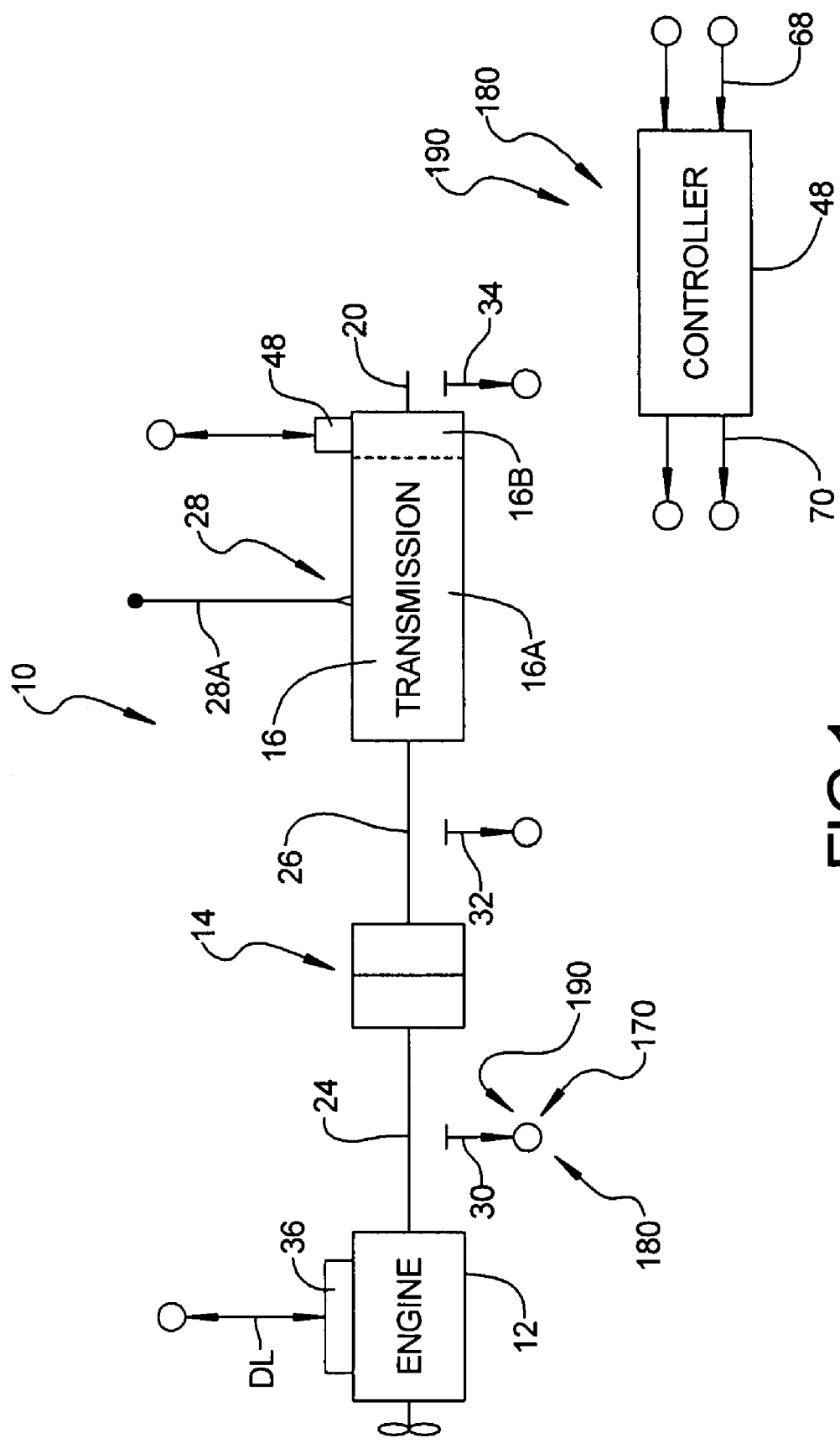
FIG. 1 is a schematic illustration of an ECU-assisted, non-synchronized compound mechanical drivetrain system according to an embodiment.

FIG. 1 illustrates a computer-assisted (i.e., microprocessor-based, controller-assisted) vehicular compound mechanical drivetrain system 10. The drivetrain system 10 may be of the type commonly utilized in heavy-duty vehicles, such as the conventional tractors of tractor/semi-trailer vehicles, and includes an engine, typically a diesel engine, a master friction clutch contained within a clutch housing, a multiple-speed compound transmission and a drive axle assembly (not shown).

In the embodiment illustrated, system 10 includes an engine 12, a transmission clutch 14, and a transmission 16. The transmission 16 includes an output shaft 20 drivingly coupled to a vehicle drive shaft by a universal joint for driving the drive axle assembly. The transmission 16 is housed within a transmission housing to which is directly mounted the shift tower of the shift lever assembly 28. The present system is equally applicable to remotely mounted shift levers, as are used in cab-over-engine types of vehicles.

In the exemplary embodiment illustrated, the main clutch 14 is a centrifugal clutch that engages the engine 12 for rotation with the transmission 16 at above about 1200 rotations per minute (RPM). While system 10 is illustrated with a manual shift lever and centrifugal clutch, this is for illustrative purposes only and not intended to be limiting. Transmission 16, by way of example, may be of the type well known in the prior art and sold by the assignee of this application, EATON CORPORATION, under the trademarks "Super-10" and "Lightning", and may be seen in greater detail by reference to U.S. Pat. Nos. 4,754,665; 5,370,013; 5,974,354; 5,974,906; and 6,015,366, the disclosures of which are incorporated herein by reference.

Typically, the shift level assembly 28 will include a shift finger or the like (not shown) extending downwardly into a shifting mechanism (not shown), such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

Shifting of transmission 16, comprising non-synchronized main section 16A coupled in series to auxiliary section 16B, is semi-automatically implemented/assisted by the vehicular transmission system 10. Main section 16A includes an input shaft 26, which is operatively coupled to the drive or crank shaft 24 of the vehicle engine 12 by master clutch 14, and output shaft 20 of auxiliary section 16B is operatively coupled, commonly by means of a drive shaft, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever 28A according to the shift pattern prescribed to engage the particular desired gear ratio.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor. As is also known, the rotational speed (OS) of the output shaft 20 is indicative of vehicle ground speed.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor (not shown) may be provided or throttle position (THL) may be sensed from the data link. Gross engine torque (TEG) and base engine friction torque (TBEF) also are available on the data link.

A sensor 42 provides a signal (CL) indicative of clutch-engaged or -disengaged condition. The condition of the clutch also may be determined by comparing engine 12 speed to input shaft 26 speed if both signals are available. An auxiliary section actuator 44 including a range shift actuator and a splitter actuator 46 is provided for operating the range clutch (shown as 130 in FIG. 2) and the splitter section clutch (shown as 88 in FIG. 2) in accordance with command output signals from ECU 48.

The system 10 includes a control unit or ECU 48, preferably a microprocessor-based control unit of the type illustrated in U.S. Pat. Nos. 4,595,986; 4,361,056 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or a display. A separate system controller may be utilized, or the engine controller, ECU 36, communicating over an electronic data link, may be utilized. Input signals 68 include information from data link DL and various sensors discussed herein.

As shown in aforementioned U.S. Pat. Nos. 5,651,292 and 5,661,998, the splitter actuator 46 is, preferably, a three-position device, allowing a selectable and maintainable splitter-section-neutral. Alternatively, a "pseudo" splitter-neutral may be provided by de-energizing the splitter actuator when the splitter clutch is in an intermediate, non-engaged position.

Figure 2:
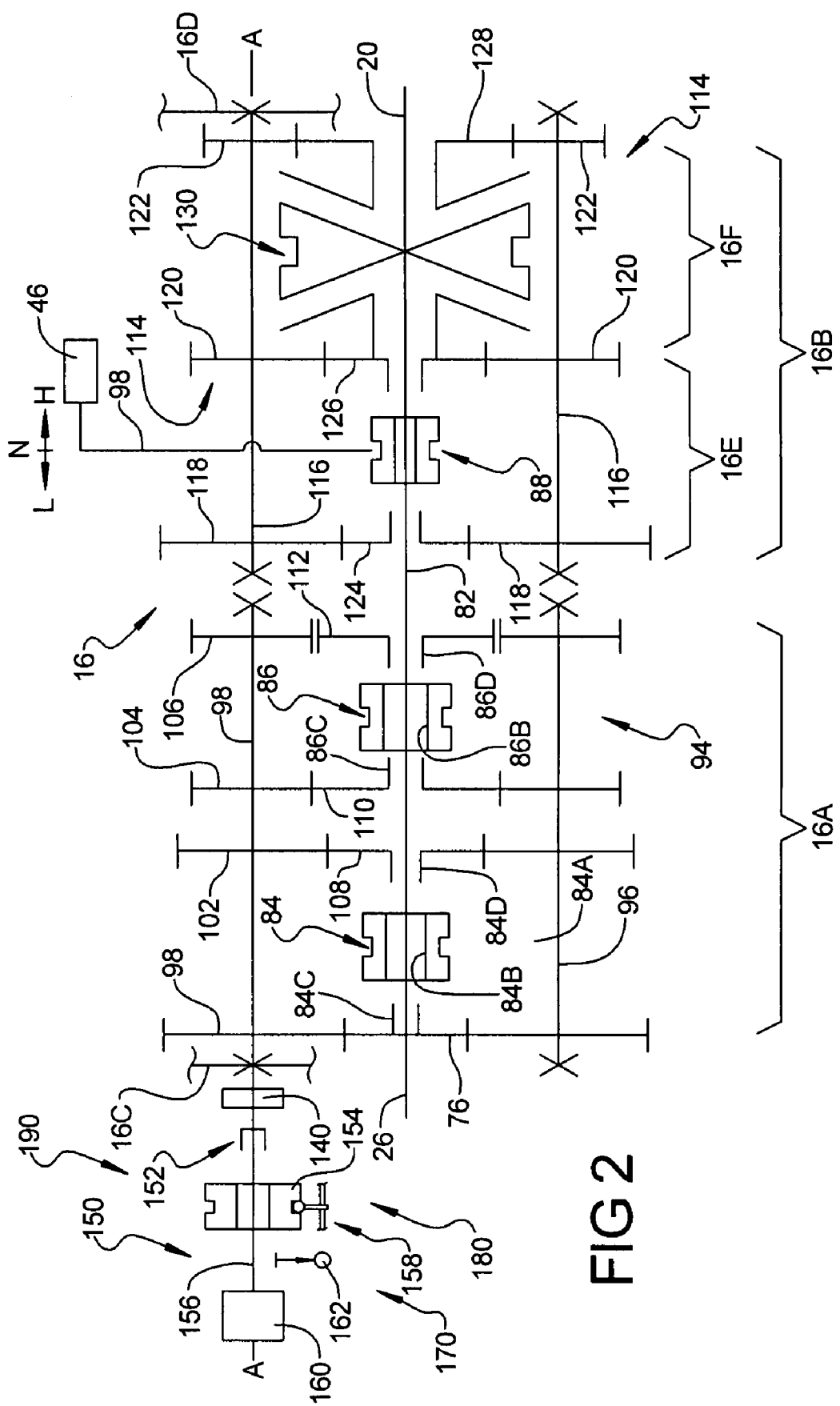
FIG. 2 is a schematic illustration of the structure of the compound mechanical transmission of FIG. 1.

The structure of the 10-forward-speed combined range-and-splitter-type synchronized transmission 16 is schematically illustrated in FIG. 2. Transmissions of this general type are disclosed in aforementioned U.S. Pat. Nos. 5,000,060; 5,370,013 and 5,390,561.

Transmission 16 includes a non-synchronized main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith. The mainshaft 82 carries a splined mainshaft first jaw clutch 84 and a second jaw clutch 86, and the mainshaft splitter clutch 88. Shift forks (not shown) are provided for axially moving the clutches 84 and 86 relative to the mainshaft 82 and are controlled by shift lever 28A acting on the shift lever assembly 28, as is known. Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gears 98, 102, 104 and 106 fixed thereto. Gear pairs 98, 102, 104 and 106 are constantly meshed with input gear 76, mainshaft gears 108 and 110 and an idler gear (not shown), which is meshed with reverse mainshaft gear 112, respectively. At least one of the countershafts 96 is provided for driving a PTO or the like.

The auxiliary section 16B of transmission 16 includes a splitter section 16E and a range section 16F. Auxiliary section 16B includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter jaw clutch 88 is fixed to mainshaft 82 for selectively clutching either gear 124 or 126 thereto, while synchronized range clutch 130 is fixed to output shaft 20 for selectively clutching either gear 126 or gear 128 thereto.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch such as a button or the like on the shift knob, as is known in the prior art and to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1).times. (2.times.2)" type transmission providing nine or ten selectable forward speeds, depending upon the desirability and practicality of splitting the low gear ratio.

Preferably, splitter shifting of transmission 16 is accomplished responsive to initiation by a vehicle operator-actuated splitter button or the like, usually a button located at a knob of the shift lever 28A, while operation of the range clutch shifting assembly is an automatic response to movement of the gear shift lever 28A between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561,325; 4,663,725, and 6,463,823.

As best seen in the exemplary embodiment of FIG. 2, an inertia brake 140 is coupled to one of the countershafts 96 and the housing 16C. The inertia brake 140 may be used to selectively retard the rotational speed of countershafts 96 and input shaft 26 for a hill holding function and/or a synchronizing function during shifting.

Inertia brakes are typically relatively low-capacity friction devices operated automatically. In an embodiment that includes a manually actuated clutch, overtravel of the clutch pedal may be sensed and used as an input for operation of an inertia brake, such as the inertia brake 140, to synchronize the gearset to be engaged.

In the embodiment illustrated, one of the countershafts 96 is also coupled to a power take off (PTO) 150. The PTO 150 includes a PTO input member 152, a PTO output member 154, a PTO output shaft 156 having an axis A-A, a PTO engaging device 158, and a PTO driven device 160. In the embodiment illustrated, the PTO output member 154 is a jaw clutch, splined to the PTO output shaft 156 and axially moveable by the PTO engaging device 158 relative to the PTO output shaft 156 in order to mesh the PTO output member 154 with the PTO input member 152, similar to clutches 84 and 86 above. That is, the PTO input member 152 and the PTO output member 154 are selectively engageable and disengagable to provide torque from system 10 to the PTO 150, as desired. The ECU 48 also includes a PTO output shaft speed sensor 162 for detecting the speed of the PTO output shaft 156. While the PTO 150 and the inertia brake 140 are illustrated adjacent one another at one end of a countershaft 96, the PTO 150 and the inertia brake 140 may be coupled to the system 10 at other locations.

The ECU 48 preferably monitors parameters of the system 10, or representative values of these parameters, such as the engine 12 rotational speed, the PTO output shaft 156 rotational speed, and the countershaft 96 rotational speed. The ECU may also provide a command for engagement of the PTO output member 154 with the PTO input member 152, and for actuation of the inertia brake 140. In the embodiment illustrated, the ECU 48 includes the logic for engaging the PTO 150 for rotation with the system 10, although this logic may be included in other suitable controllers.

Figure 3:
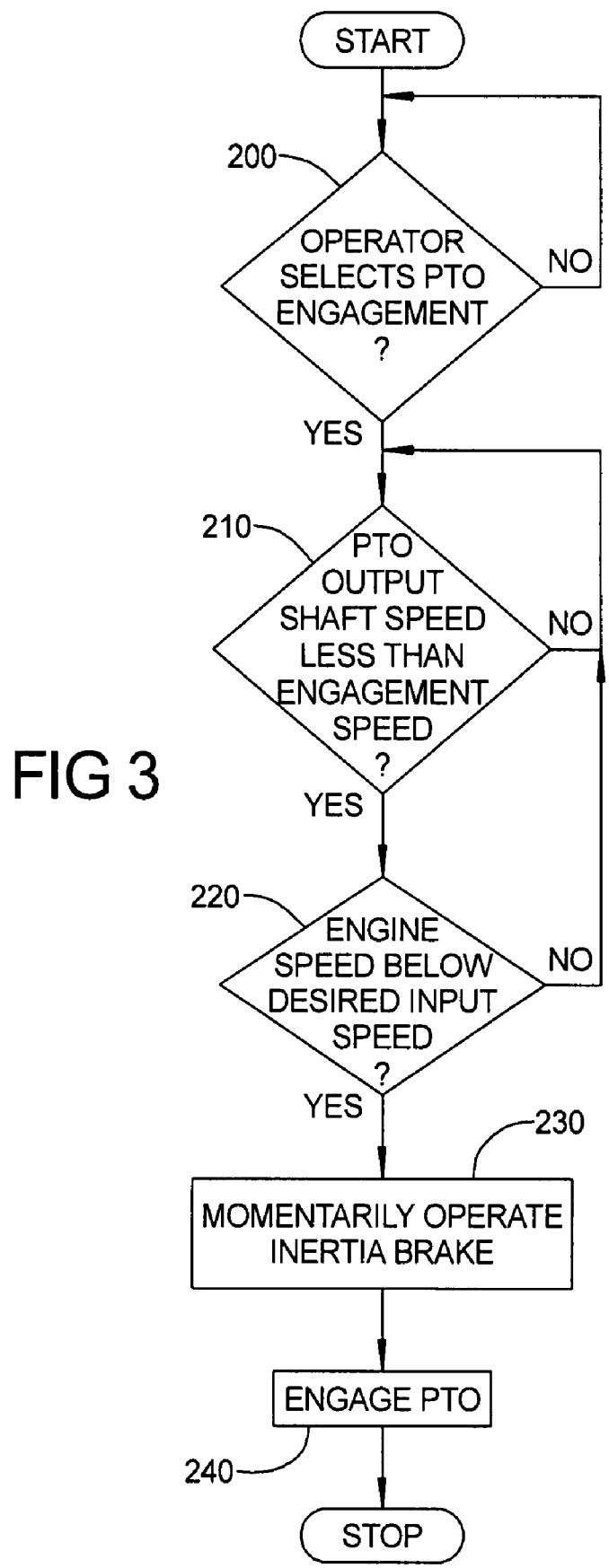
FIG. 3 is a schematic illustration, in flow chart format, of a control system, according to an embodiment.

With reference to FIG. 3, an illustrated embodiment of operation of the engagement strategy for the PTO 150 is as follows. The ECU 48 may monitor parameters including 1) whether the PTO 150 is engaged for rotation with the system 10, 2) when an operator desires to engage the PTO 150, 3) the PTO output shaft 156 rotational speed, 4) the engine 12 rotational speed, and 5) the axial position of the PTO output member 154 relative to the PTO output shaft 156. Collectively, the portion of the ECU 48 that performs the functions described herein, the PTO engaging device 158, the inertia brake 140, and the sensors (specifically the engine rotational speed sensor 30 and the PTO output shaft speed sensor 162) described herein comprise a PTO engaging system 170 (referred to generally in FIGS. 1 and 2).

The operation starts at Step 200 where the system 10 detects an operator desire to engage the PTO 150 for rotation with the system 10. When this is detected, the operation moves to Step 210 where the ECU 48 detects a value representative of the PTO output shaft 156 rotational speed and compares this value to a predetermined engagement speed range. The PTO output shaft 156 engagement speed range is desirably close to zero RPM, although a minimal speed (such as, for example, below 80 RPM) may be selected and programmed into the ECU 48, as desired. Also, the detected PTO output shaft 156 rotational speed may be less than zero RPM, as the PTO driven accessory, such as a pump impellor, may be causing the PTO output shaft 156 to counter-rotate opposite the driven direction of rotation. Therefore, a desired engagement speed range of about −50 RPM to about 80 RPM may be programmed into the ECU 48.

If the value representative of the PTO output shaft 156 rotational speed is within the predetermined engagement speed range, the operation proceeds to Step 220. If the value representative of the PTO output shaft 156 rotational speed is not within the predetermined engagement speed range, the operation returns to Step 210.

In Step 220, the ECU 48 determines if a value representative of the crank shaft 24 of the engine 12 rotational speed is below a desired input speed value. In the embodiment illustrated, the desired input speed value is less than the engagement speed of the centrifugal clutch 14 to ensure that the engine 12 is not transmitting torque to input shaft 26 of the transmission 16. When the engine 12 is not transmitting torque to input shaft 26, the inertia brake 140 may be used to retard rotation of the PTO input member 152 without inducing undue stress on the inertia brake 140, although the inertia brake 140 may be applied while the engine 12 is transmitting torque to the input shaft 26.

If the determination of Step 220 is positive, the operation proceeds to Step 230. If the determination of Step 220 is negative, the operation returns to Step 210.

In step 230, the ECU 48 will momentarily operate the inertia brake 140 to reduce the rotational speed of the PTO input member 152 to about zero RPM. This inertia brake 140 operation may be continuous or intermittent, as desired.

In step 240, the ECU 48 will engage the PTO 150 by moving the PTO output member 154 into engagement with the PTO input member 152.

In the embodiment illustrated, the transmission 16 is illustrated as a compound transmission including the auxiliary section 16B, other embodiments may utilize a transmission without an auxiliary section, or no transmission at all for engaging and disengaging a PTO.

Engagement of the inertia brake 140 may be through a ball ramp clutch, as illustrated in U.S. Pat. No. 5,713,445, or may be through an electric over air signal. As used herein, the term 'synchronized' includes meshing gears that have exactly the same rotational speeds, or rotational speeds that are relatively close to permit meshing of complementary components with minimal damage to meshing surfaces. The term 'synchronize' refers to the act of attaining a minimum speed differential between a first component and a second component by contacting a portion of one of the components with a portion of the other components, such as with a cone clutch positioned adjacent the first component and the second component such that the contacting portions of the cone clutch contact and reduce the speed of one component, increase the speed of the other component, or by a combination of both, ensure that the rotational speeds of the first component and the second component are about equal. Once the rotational speeds of the first component and the second component are about equal, a jaw clutch may be engaged as meshing teeth are brought into contact with one another to provide a more positive transfer of torque.

Accordingly, the PTO 150 engagement is accomplished without contacting a rotational portion of the PTO output member 154 with a rotational portion of the PTO input member 152.

In the embodiment illustrated, a synchronizing clutch, or hot-shift clutch, is not necessary for engagement of the PTO 150 while the crank shaft 24 of the engine 12 is rotating. That is, engagement of the PTO input member 152 (jaw clutch) is achieved by slowing the rotation of the countershaft 96 to about zero RPM when the jaw clutch is rotating below a predetermined value.

In the embodiment illustrated, clutches 84 and 86 are double-acting devices movable fore and aft from the centered positions thereof to engage a selected main section ratio. By way of example, a first jaw clutch 84 is defined by a first array of clutch teeth 84B carried by the leftward end of clutch member 84, which are engageable with a second array of clutch teeth 84C carried by input gear 76 and a third array of clutch teeth 84D carried by the gear 108. Similarly, the second jaw clutch 86 is defined by a first array of clutch teeth 86B carried by the leftward end of clutch member 86, which are engageable with a second array of clutch teeth 86C carried by gear 110 and a third array of clutch teeth 86D carried by the gear 112.

Collectively, the main section 16A, including the clutches 84 and 86 and the shift lever assembly 28 comprise a shifting system 180 (referred to generally in FIGS. 1 and 2). The gears 76, 98, 102, 104, 106, 108, 110, 112, and shafts 26, 96, 82 may be referred to as transmission rotational components. An embodiment of engagement of a speed ratio of transmission 16 using the shifting system 180 is follows.

Referring specifically to the clutch 86 of FIG. 2, an operator may be operating the system in reverse, with the second jaw clutch 86 engaged with the gear 112. That is, the first array of clutch teeth 86B are meshed with the third array of clutch teeth 86D and torque transferred from the engine 12 is used to drive the vehicle in a reverse direction. When the operator desires to operate the vehicle in a forward direction, the operator releases the engine throttle, as the rotational speed of the crank shaft 24 and the clutch 14 declines. The operator then selects the forward low-speed gear and the ECU 48 detects whether the engine speed has fallen below the actuating speed of the centrifugal clutch 14. When the engine speed has fallen below the actuating speed of the centrifugal clutch 14, then the idling of the engine 12 that rotates the crank shaft 24 will not positively drive rotation of the input shaft 26 of the transmission 16. Since this operation from de-selection reverse to selecting the low-speed ratio generally takes place in a relatively short period of time, the input shaft 26 may be rotating as the operator moves the shift lever 28A which causes the second jaw clutch 86 to disengage with the third array of clutch teeth 86D and move toward engagement with the second array of clutch teeth 86C. The inertia brake 140 may be briefly actuated in order to retard the rotation of the shafts 26 and 96 in order to synchronize the first array of clutch teeth 86B with the second array of clutch teeth 86C just prior to engagement. Therefore, the second jaw clutch 86 may engage the mainshaft 82 with the gear 110 in order to provide for a forward gear ratio, while using the inertia brake 140 to reduce damage to the clutch 86.

During the engagement of a driveline system 10 gear with the use of the inertia brake 140 as described above, the ECU 48 may detect the movement of the clutch 86 and/or the movement of the lever 28 to initiate the operation of the inertia brake 140, or the inertia brake 140 may be actuated each time the vehicle has slowed to almost a complete stop and the input shaft 26 or the countershaft 96 is rotating at above a predetermined speed.

Although the steps of the operating the system 10 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method of operating a drivetrain system, the drivetrain including a PTO and a transmission having multiple speed ratios and an inertia brake, the PTO including a PTO output member engageable with a PTO input member, the method comprising:

reducing the speed of one of the PTO output member and the PTO input member with an inertia brake, wherein reducing the speed includes stopping, at least momentarily, the rotation of one of the PTO output member and the PTO input member while maintaining an engine speed, at least one of the PTO output member and the PTO input member including a jaw type clutch; and engaging the PTO input member with the PTO output member without the use of a friction clutch to synchronize the speed of the PTO input member with the PTO output member.

2. The method of claim 1, further comprising monitoring a speed value representative of a rotational speed of a PTO component.

3. The method of claim 1, further comprising detecting whether the PTO is engaged for rotation with the drivetrain.

4. The method of claim 1, further comprising verifying that the PTO output member speed is within a desired shifting range.

5. The method of claim 1, wherein reducing is performed without contacting a rotational portion of the PTO output member with a rotational portion of the PTO input member.

6. The method of claim 1, further comprising a centrifugal clutch wherein the engine speed is only less than an engagement speed of the centrifugal clutch, and greater than about zero RPM.

7. A method of operating a drivetrain, the drivetrain including a multispeed transmission, an engine, and a main clutch operably interposed between the engine and the transmission by way of at least a drive shaft, the method comprising:

detecting a value representative of the speed of a PTO output member;

detecting a value representative of the speed of a PTO input member;

at least one of the PTO output member and the PTO input member including a jaw type clutch;

reducing the speed of one of the PTO output member and the PTO input member with an inertia brake wherein reducing the speed includes stopping one of the PTO output member and the PTO input member while maintaining a non-zero rotation of the drive shaft representing a continued engine speed; and engaging the PTO input member with the PTO output member without the use of a friction clutch to synchronize the speed of the PTO input member with the PTO output member.

8. The method of claim 7, further comprising verifying that the PTO output member speed is within a desired shifting range.

9. The method of claim 7, wherein reducing the speed of one of the PTO output member and the PTO input member is performed without contacting a rotational portion of the PTO output member with a rotational portion of the PTO input member.

10. The method of claim 7, further comprising reducing the speed of a transmission rotational component with the inertia brake for engaging a speed ratio of the transmission.

11. The method of claim 10, wherein reducing the speed of a transmission rotational component with the inertia brake does not involve stopping the rotation of the transmission rotational component.

12. The method of claim 7, wherein the continued engine speed is only less than an engagement speed of the centrifugal clutch, and greater than about zero RPM.

13. A powertrain system comprising:

a multispeed transmission defining a plurality of speed ratios;

a power take off (PTO) having a PTO input member selectively rotationally engaged with a PTO output member, at least one of the PTO input member and the PTO output member including a jaw type clutch;

an inertia brake for reducing the speed of the PTO input member;

a detection system for detecting a value representative of a speed of the PTO output member; and a controller in communication with the detection system and having an output for actuating the inertia brake and an output for engaging the PTO input member with the PTO output member, wherein the inertia brake selectively reduces the rotational speed of a transmission component for engaging the PTO input member with the PTO output member, the controller configured to operate the inertia brake to stop, at least momentarily, the rotation of one of the PTO output member and the PTO input member without a corresponding stopping of an engine speed represented by rotation of a drive shaft from an engine.

14. The system of claim 13, wherein the inertia brake selectively reduces the rotational speed of a transmission rotational component for shifting the transmission into a speed ratio.

15. The system of claim 13, wherein the detection system detects a value representative of a relative speed between the PTO input member and the PTO output member.

16. The system of claim 13, wherein the PTO input member has teeth that are selectively engaged with teeth of the PTO output member upon engagement of the PTO input member and the PTO output member.

17. The system of claim 13, further comprising a shifting system for the multispeed transmission, wherein the shifting system selectively reduces the speed of a transmission rotational component using the inertia brake to engage a transmission speed ratio.

18. The system of claim 13, wherein the inertia brake is applied while the drive shaft of the engine is transmitting torque.

19. The system of claim 13, wherein the PTO and the inertia brake are adjacent to one another.

* * * * *